United States Patent

Ohtsuka et al.

[11] Patent Number: 5,923,751
[45] Date of Patent: *Jul. 13, 1999

[54] OPENING AND CLOSING DEVICE FOR A PORTABLE TELEPHONE

[75] Inventors: Yoshihiro Ohtsuka; Michio Nagai, both of Tokyo, Japan

[73] Assignees: Katoh Electrical Machinery Co., Ltd., Kanagawa; NEC Corporation, Tokyo, both of Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/551,321

[22] Filed: Nov. 1, 1995

[30] Foreign Application Priority Data

Nov. 15, 1994 [JP] Japan .................................. 6-280900

[51] Int. Cl.⁶ ...................................................... H04M 1/00
[52] U.S. Cl. ........................................... 379/433; 379/434
[58] Field of Search ..................................... 379/428, 434; 455/89, 90

[56] References Cited

U.S. PATENT DOCUMENTS

| | | | |
|---|---|---|---|
| 4,897,873 | 1/1990 | Beutler et al. | 379/433 |
| 5,185,790 | 2/1993 | Mischneko | 379/433 |
| 5,260,998 | 11/1993 | Takagi | 379/433 |
| 5,278,993 | 1/1994 | Reiff et al. | 455/90 |
| 5,436,954 | 7/1995 | Nishiyama et al. | 379/58 |

*Primary Examiner*—Jack Chiang
*Attorney, Agent, or Firm*—Notaro & Michalos P.C.

[57] ABSTRACT

The invention provides an opening and closing device for a portable telephone wherein a receiver section can be opened by one touch by depressing a push-button while holding the portable telephone with one hand and can be stopped freely at any angle from a predetermined opening angle and besides, also when the receiver section is in a closed condition, the closed condition of the receiver section can be kept stably.

6 Claims, 7 Drawing Sheets

OPENING AND CLOSING DEVICE FOR A PORTABLE TELEPHONE

BACKGROUND OF THE INVENTION

1. Field of the Invention

This invention relates to an opening and closing device suitable for use with a portable telephone wherein a transmitter section and a receiver section are folded in a twofold condition when the portable telephone is carried but are opened when the portable telephone is to be used.

2. Description of the Related Art

Conventionally, as an opening and closing device for mounting a receiver section of a twofold portable telephone for opening and closing movement on a transmitter section, an opening and closing device of the free stopping type having a friction function is known.

However, as portable telephones are popularized, a demand for higher convenience increases, and an opening and closing device which is constructed so that the receiver section can be opened relative to the transmitter section by one touch only by one hand is demanded.

SUMMARY OF THE INVENTION

It is an object of the present invention to provide an opening and closing device for a portable telephone wherein a receiver section can be opened by one touch by depressing a push-button while holding the portable telephone with one hand and, also when the receiver section is in a closed condition, the closed condition of the receiver section can be kept stably.

It is another object of the present invention to provide an opening and closing device for a portable telephone wherein a receiver section can be opened with respect to a transmitter section by one touch using one hand and the opening and closing device itself can stably lock the receiver section in its closed condition.

It is a further object of the present invention to provide an opening and closing device for a portable telephone wherein a receiver section can be opened with respect to a transmitter section by one touch using one hand and the opening and closing device itself can stably lock the receiver section in its closed condition and besides the receiver section can be stopped freely at any angle from a predetermined opening angle.

DESCRIPTION OF THE PREFERRED EMBODIMENT

Figure 1:
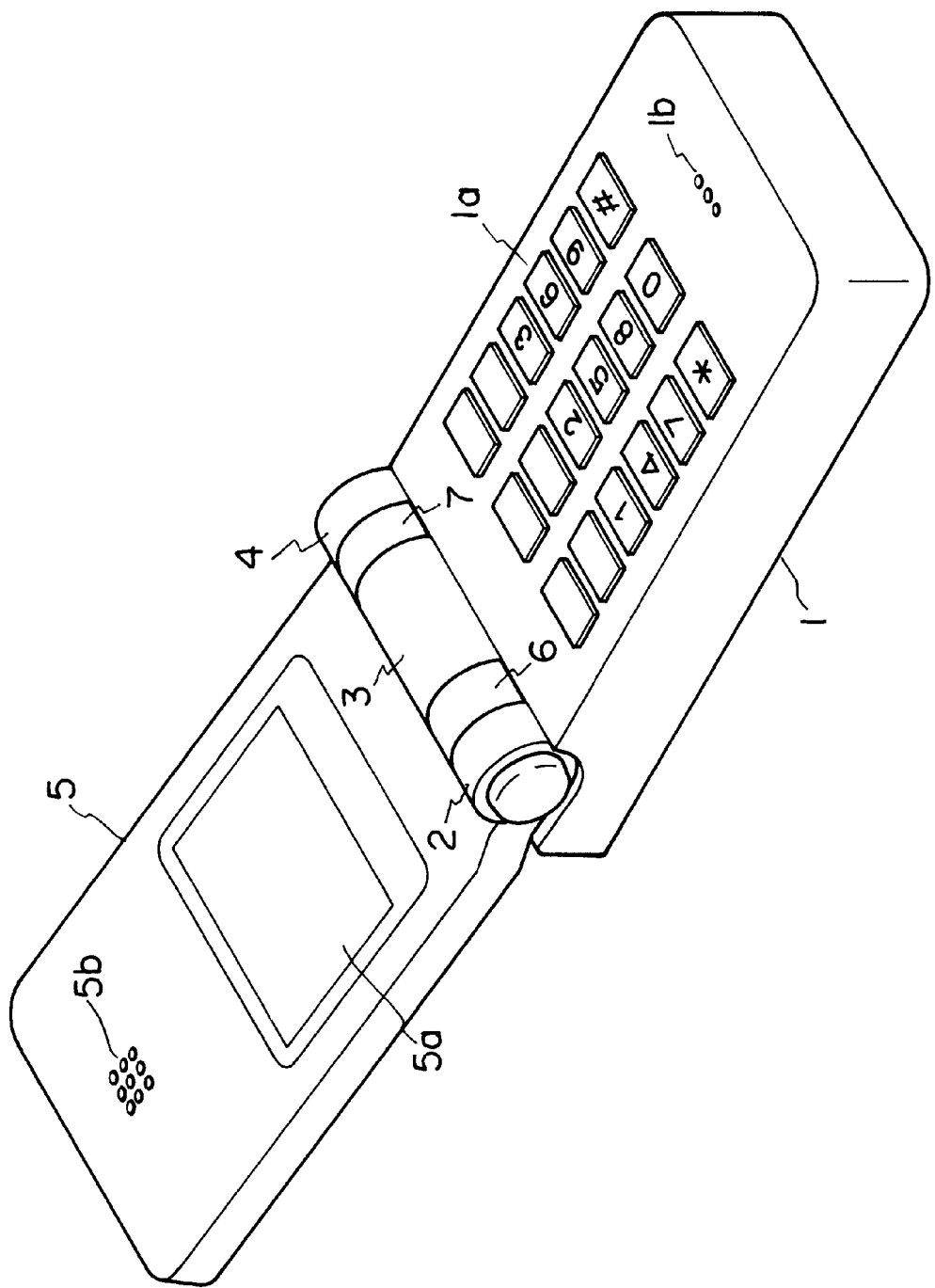
FIG. 1 is a perspective view of a potable telephone embodying the present invention.
Figure 2:
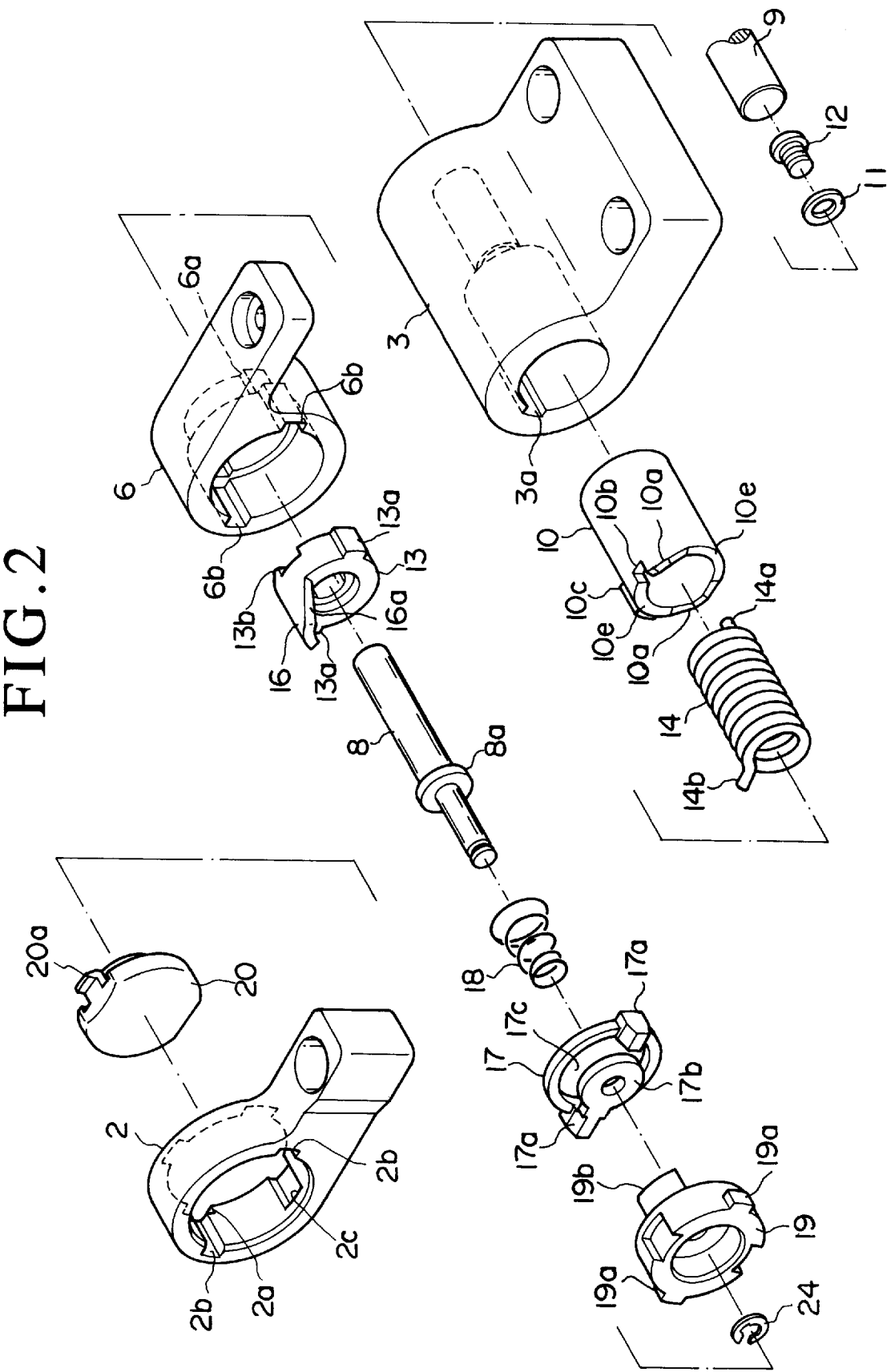
FIG. 2 is an exploded perspective view of an opening and closing device of the portable telephone according to the present invention.

The drawings show an embodiment of the present invention. Referring to FIG. 1, a transmitter section 1 carries an manual operation portion 1a including a plurality of manually operable buttons and a microphone portion 1b. A first mounting portion 2, a second mounting portion 3 and a third mounting portion 4 each having a tubular portion are mounted in a predetermined spaced relationship from each other in this order from the left side at an end portion of the transmitter section 1. The second mounting portion 3 has the greatest length among the first, second and third mounting portions 2, 3 and 4. The mounting portions 2 to 4 may alternatively be formed integrally with the transmitter section 1. Still referring to FIG. 1, reference numeral 5 denotes a receiver section on which a display portion 5a and a loudspeaker portion 5b are provided. A fourth mounting portion 6 and a fifth mounting portion 7 each similarly having a tubular portion are provided at an end portion of the receiver section 5 and individually fitted between adjacent ones of the mounting portions 2 to 4 of the transmitter section 1 side, and the fourth mounting portion 6 side is connected for pivotal motion to the first mounting portion 2 and the second mounting portion 3 by means of a hinge shaft 8 as seen in FIG. 2 and so forth. Though not shown sufficiently, the fifth mounting portion 7 is connected for pivotal motion between the second mounting portion 3 and the third mounting portion 4 by way of a hinge pin 9 shown in FIGS. 3 to 5 which is coaxial with the hinge shaft 8.

The opening and closing device according to the present invention is provided on the hinge shaft 8 side and will be described in detail below.

A tubular stator 10 is accommodated in the inside of the second mounting portion 3. The stator 10 has a pair of first convex portions 10a and an arresting groove 10b provided in an axial direction at an end face thereof, and the hinge shaft 8 extends coaxially in an inner hollow portion of the stator 10. The stator 10 has an arresting rib 10c provided on an outer periphery thereof and fitted in an engaging groove 3a formed on an inner periphery of the second mounting portion 3 so that the stator 10 may not be rotated relative to the second mounting portion 3. However, the stator 10 may alternatively be formed integrally with the second mounting portion 3. The hinge shaft 8 is securely mounted at an end portion thereof to a mounting wall 3b provided in the second mounting portion 3 by means of a mounting screw 12. A rotor 13 is accommodated in the fourth mounting portion 6 of the receiver section 5 side which contacts with an end face of the second mounting portion 3. The hinge shaft 8 extends coaxially in an inner hollow portion of the rotor 13, and the rotor 13 is held in position by a flange portion 8a of the hinge shaft 8. The rotor 13 has a pair of arresting projections 13a formed to extend outwardly from an outer periphery thereof. The arresting projections 13a of the rotor 13 are engaged with a pair of first engaging grooves 6a provided on an inner periphery of the fourth mounting portion 6 to secure the rotor 13 to the fourth mounting portion 6. The hinge shaft 8 is accommodated in the stator 10 while a torsion spring 14 is wound spirally around the hinge shaft 8. The torsion spring 14 is arrested at a first end portion 14a thereof by an arresting hole 10d provided in the stator 10 and at the other, a second end portion 14b thereof with an arresting portion 13b provided arcuately in a concave condition on the other end face of the rotor 13. The arresting portion 13b has an inclined portion 13c provided at an end thereof such that it is inclined in a direction to rewind the torsion spring 14.

Figure 4:
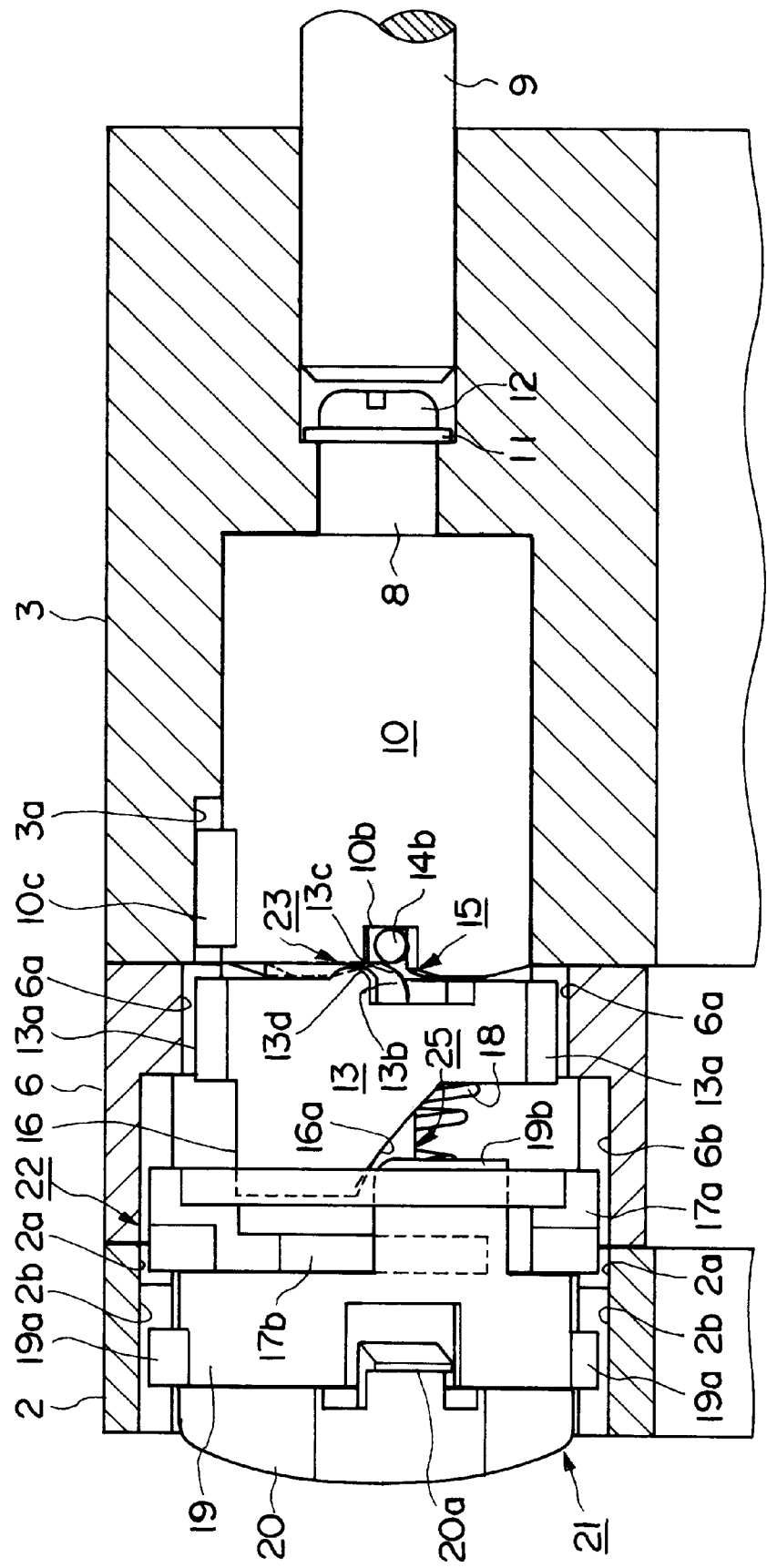
FIG. 4 is a sectional view illustrating a positional relationship of various components when the receiver section is closed.
Figure 5:
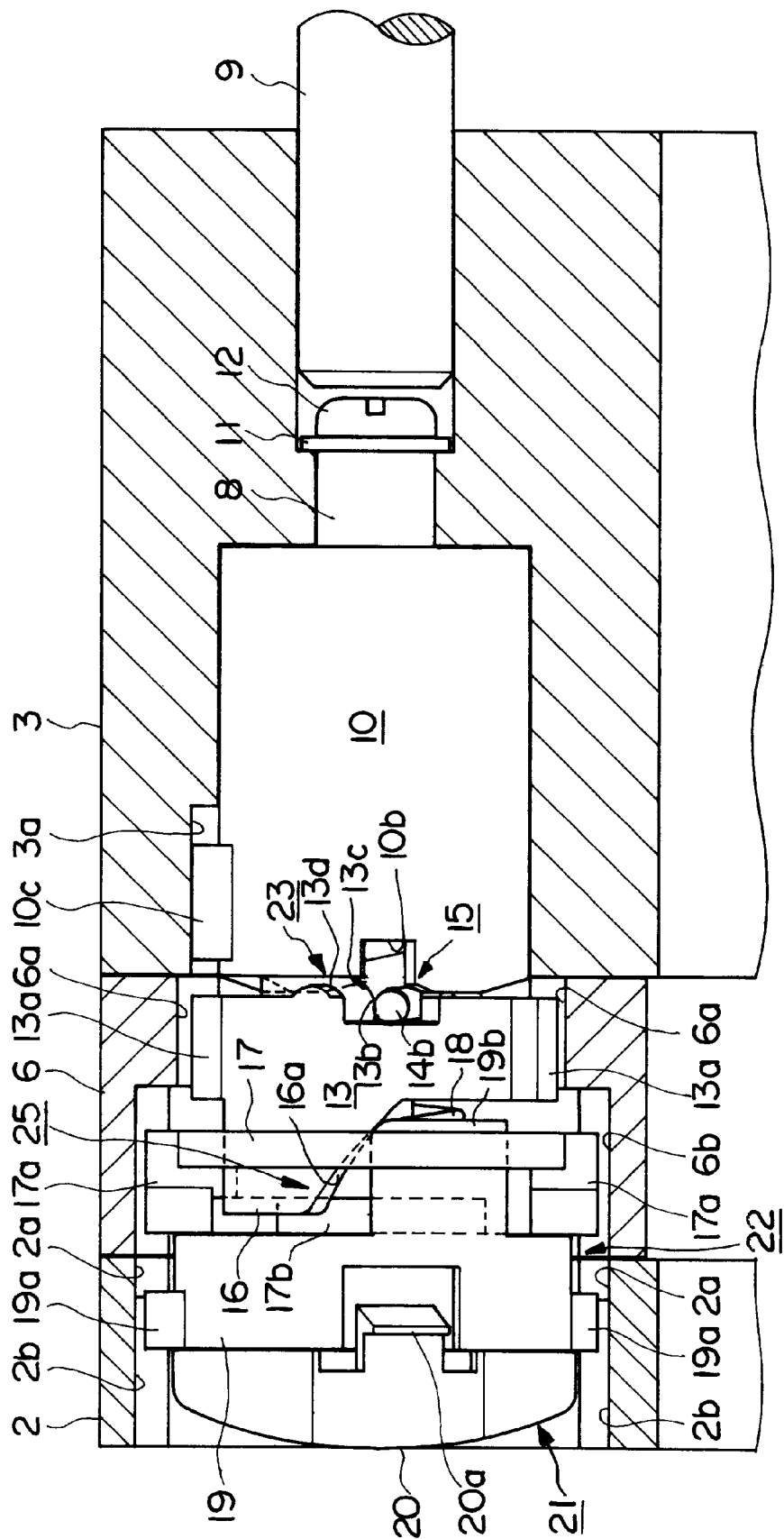
FIG. 5 is a sectional view illustrating the positions of various components when a locked condition of the receiver section by locking means is canceled.

As particularly seen in FIGS. 4 and 5, arresting means 15 for the torsion spring 14 is formed from the arresting portion 13b provided on the rotor 13 and having the inclined portion 13c, and the arresting groove 10b provided on the stator 10 side.

The rotor 13 further has a pair of second convex portions 13d provided on an end face thereof adjacent to the arresting means 15. The second convex portions 13d of the rotor 13 are opposed to the first convex portions 10a provided on the end face of the stator 10. A friction mechanism 23 is formed from the first convex portions 10a and the second convex portions 13d.

Subsequently, locking means 22 will be described. A locking member 17 having a larger diameter than that of the rotor 13 is accommodated in the fourth mounting portion 6 remote from the end portion in which the rotor 13 is fitted. The locking member 17 has a pair of arresting projections 17a formed on an outer periphery thereof. The arresting projections 17a of the locking member 17 are held in engagement with a pair of second engaging grooves 6b of the fourth mounting portion 6 of the receiver section 5 side in such a manner as to allow the locking member 17 to slidably move in an axial direction in and with respect to the fourth mounting portion 6. The hinge shaft 8 extends coaxially in an inner hollow portion of the locking member 17. A compression spring 18 is interposed between a pressure receiving plate 17b of the locking member 17 and the flange portion 8a of the hinge shaft 8 to normally urge the locking member 17 to slidably move in one direction. The first mounting portion 2 has a pair of locking grooves 2a which are aligned with the arresting projections 17a of the locking member 17 at a predetermined position of the first mounting portion 2 (at a closing position of the receiver section 5).

A push-button 21 is accommodated for sliding movement in an axial direction in the inside of the first mounting portion 2. The push-button 21 includes a first push-button 19 and a second push-button 20 disposed in an overlapping relationship with each other in their axial direction. The first push-button 19 has an outer diameter substantially equal to that of the rotor 13 and has a pair of arresting projections 19a provided on an outer periphery thereof. The arresting projections 19a of the first push-button 19 are held in engagement with a pair of engaging grooves 2b of the first mounting portion 2. The hinge shaft 8 extends coaxially through the first push-button 19. An E-snap ring 24 is fitted on the hinge shaft 8 adjacent to an end of the first push-button 19 so that the first push-button 19 may not come off the hinge shaft 8, and a pressing cam portion 19b extends in an axial direction from the other end of the first push-button 19. The pressing cam portion 19b extends through an arcuate recess 17c formed on the locking member 17 until it is opposed to an inclined portion 16a of a pressure receiving cam portion 16. The pressing cam portion 19b and the pressure receiving cam portion 16 form a cam mechanism 25.

The second push-button 20 has a pair of arresting projections 20a formed on an outer periphery thereof. The arresting projections 20a of the second push-button 20 are engaged with a pair of arresting grooves 2c, which are each closed at an end thereof, provided on the first mounting portion 2 so that the second push-button 20 can slidably move in an axial direction with respect to the first mounting portion 2 but cannot come off the first mounting portion 2. The first push-button 19 and the second push-button 20 may alternatively be combined into an integral unitary member.

Figure 3:
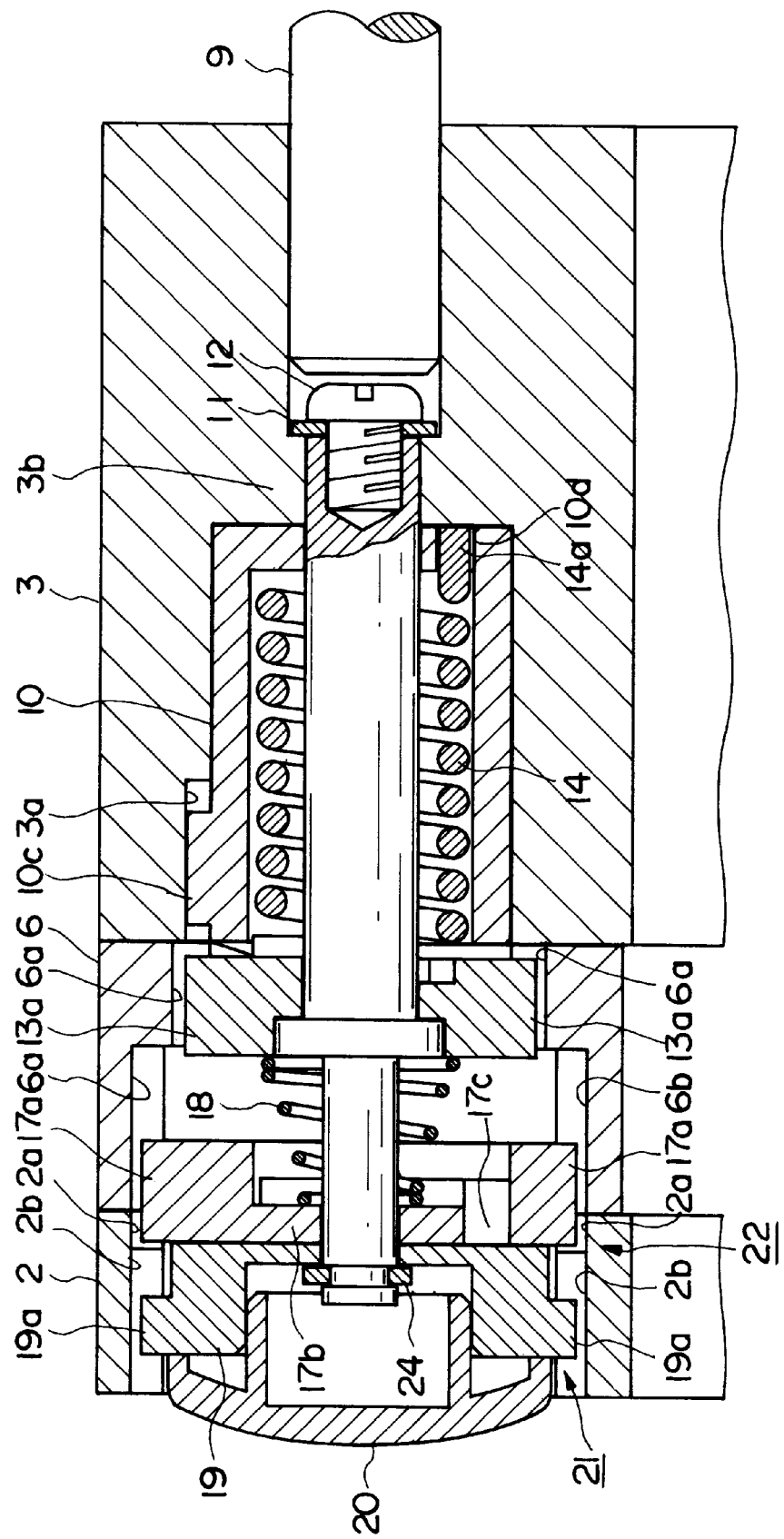
FIG. 3 is a horizontal sectional view of the opening and closing device of the portable telephone according to the present invention when a receiver section is closed.

Accordingly, in a condition wherein the receiver section 5 is closed, as seen in FIGS. 3 and 4, the second end portion 14b of the torsion spring 14 is not arrested by the arresting portion 13b of the rotor 13 but is pushed by an end edge of the arresting portion 13b until it is accommodated in a somewhat compressed condition in the arresting groove 10b of the stator 10. Further, the second convex portions 13d of the rotor 13 are accommodated in a pair of recessed portions 10e provided on the end face of the stator 10. Furthermore, the locking member 17 urged in the leftward direction by the compression spring 18 in FIGS. 3 and 4 is in a condition wherein the arresting projections 17a provided on the outer periphery thereof are held in engagement with both of the second engaging grooves 6b provided on the fourth mounting portion 6 of the receiver section 5 side and the locking grooves 2a of the first mounting portion 2 of the transmitter section 1 side. Meanwhile, also the first push-button 19 is urged in the leftward direction in FIGS. 3 and 4 by the locking member 17 until it extends outwardly from the end portion of the first mounting portion 2. Further, the pressing cam portion 19b of the first push-button 19 extends through the arcuate recess 17c of the locking member 17 until it is opposed in a somewhat spaced relationship to the inclined portion 16a of the pressure receiving cam portion 16.

Figure 6:
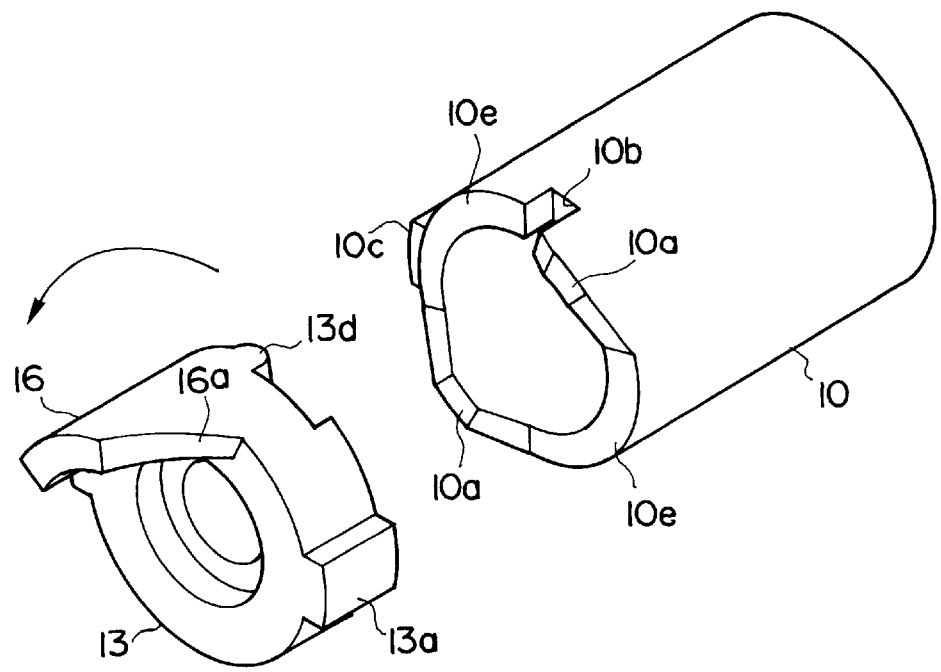
FIG. 6 is a perspective view illustrating the positional relationship between a rotor and a stator when the receiver section is closed.
Figure 7:
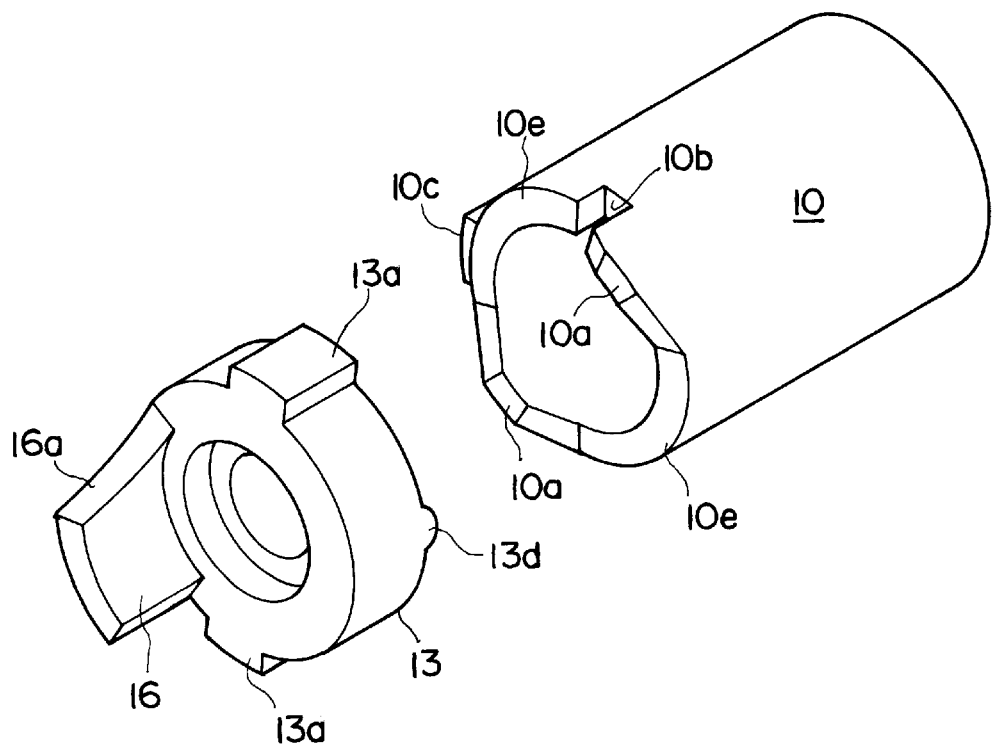
FIG. 7 is a perspective view illustrating the positional relationship between the rotor and the stator when the receiver section is opened and a friction function begins to operate.
Figure 8:
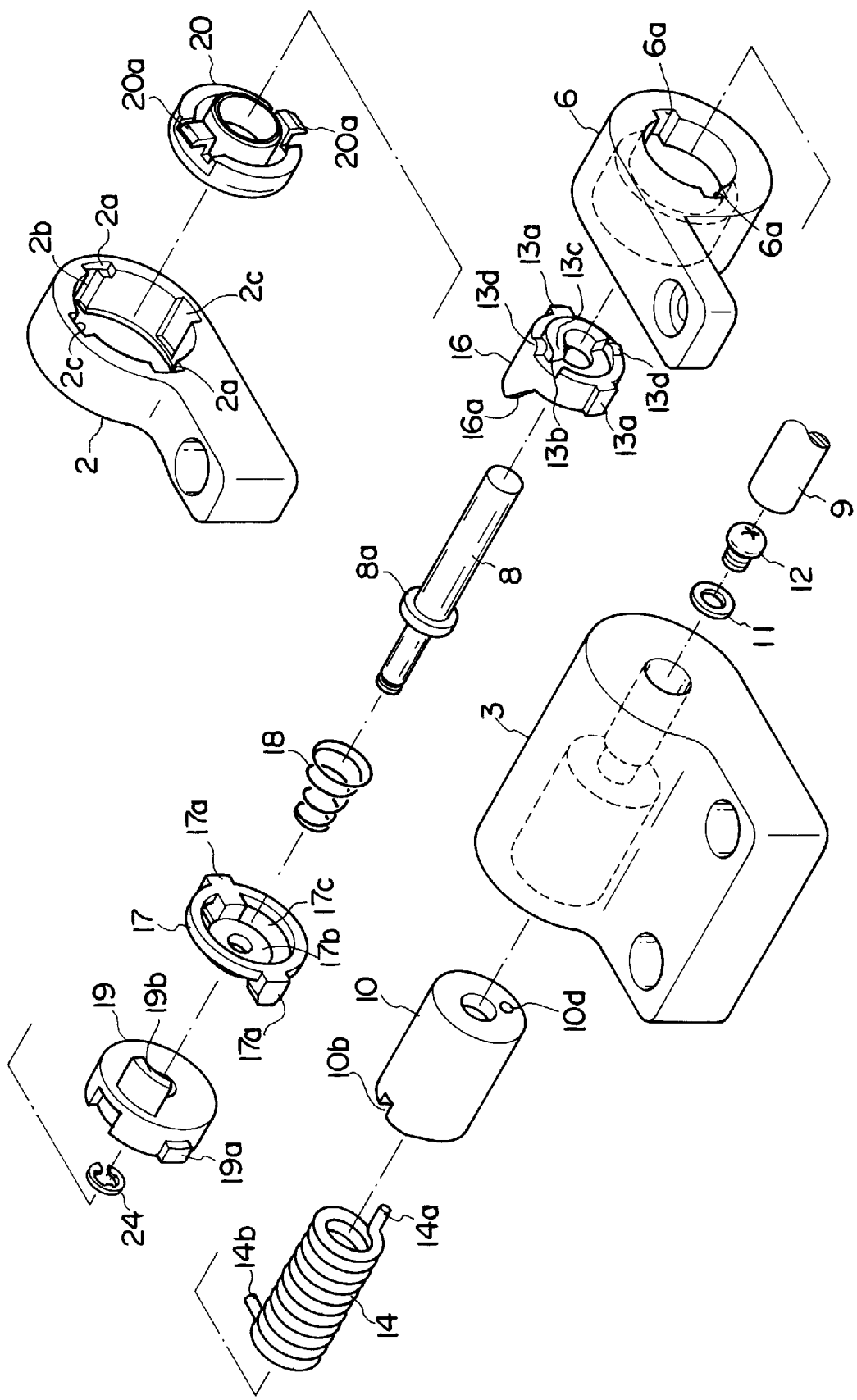
FIG. 8 is an exploded perspective view of the opening and closing device of the portable telephone according to the present invention as viewed in the opposite direction to that of FIG. 2.

If the first push-button 19 is depressed in the rightward direction in this condition, then the depressing force is transmitted to the locking member 17 by way of the second push-button 20 so that the locking member 17 is slidably moved in the rightward direction in FIGS. 3 and 4 against the urging force of the compression spring 18. Consequently, the engagement between the arresting projections 17a of the locking member 17 and the locking grooves 2a of the first mounting portion 2 of the transmitter section 1 side is canceled first, and then the pressing cam portion 19b is brought into contact with and presses the inclined portion 16a of the pressure receiving cam portion 16. As a result, the rotor 13 is rotated in the counterclockwise direction to open the receiver section 5 a little as seen in FIG. 6. Consequently, the arresting portion 13b of the rotor 13 comes to the position of the arresting groove 10b of the stator 10 as seen in FIG. 5, whereupon an end portion of the torsion spring 14 in a wound in condition and in a compressed condition is moved in the leftward direction in FIG. 5 and is arrested by the arresting portion 13b. As a result, the rotor 13 is acted upon by an urging force to rotate it in the counterclockwise direction so that the receiver section 5 in a somewhat open condition in such a manner as described above is further opened automatically by the urging force of the torsion spring 14. In this instance, since the torsion spring 14 is in a compressed condition and is arrested at the second end portion 14b thereof by the arresting portion 13b, it will not come off the arresting portion 13b irrespective of the presence of the inclined portion 13c. After the receiver section 5 is opened to a certain open angle with respect to the transmitter section 1, the torque of the torsion spring 14 becomes weak and the second convex portions 13d of the rotor 13 are contacted with the first convex portions 10a of the stator 10 as seen in FIG. 7. Consequently, the receiver section 5 can thereafter be stopped freely at any position within a predetermined open angle range by the friction action between the second convex portions 13d and the first convex portions 10a.

As the open receiver section 5 is pivoted in a closing direction, the torsion spring 14 is wound in until a predetermined closed angle is reached. However, after the predetermined closed angle is reached, the resistance of the torsion spring 14 to be wound in increases so that the second end portion 14b thereof finally slips on and is disengaged from the inclined portion 13c of the arresting portion 13b. Then, the second end portion 14b of the torsion spring 14 is pressed (compressed) in an axial direction by an edge portion of the inclined portion 13c of the arresting portion 13b until it is arrested in a wound in condition by the arresting groove 10b of the stator 10. Consequently, in a closed angle after then, the torque of the torsion spring 14 will not act upon the rotor 13, that is, upon the receiver section 5.

When the receiver section 5 is closed to 0 degree, the condition shown in FIG. 3 is reached. In this condition, the arresting projections 17a of the locking member 17 which are normally urged to slidably move in the leftward direction in FIG. 3 are engaged with the locking grooves 2a provided on the first mounting portion 2 of the transmitter section 1 side by the compression spring 18. Consequently, the receiver section 5 is locked to the transmitter section 1 in a twofold condition.

What is claimed is:

1. An opening and closing device for a portable telephone, comprising:

a pair of mounting portions provided on a base of a transmitter section and having a predetermined space formed therebetween;

a mounting portion of a receiver section disposed between the pair of mounting portions;

a hinge shaft connecting the pair of mounting portions to the mounting portion of the receiver;

a stator axially received by and fixed to one of the pair of mounting portions of the transmitter section and having the hinge shaft passing therethrough, the stator having an arresting groove and a pair of first convex portions on an exposed side end portion;

a rotor disposed within the mounting portion of the receiver section in an axially slidable manner with the hinge shaft passing through the center portion of the rotor, the rotor engaged with the mounting portion of the receiver section and having an arresting portion with an inclined portion and a pair of second convex portions on a rotor end portion facing said stator and further having a pressure-receiving cam portion projecting from the other rotor end;

a torsion spring wound around said hinge shaft and received in said stator, one end of the torsion spring being engaged with said stator while the opposite end of the torsion spring is alternately engaged with the arresting portion of the rotor and the arresting groove of said stator by a rotary position of the rotor;

a lock member disposed between the mounting portion of the receiver section and one of the pair of mounting portions of transmitter section in an axially slidable manner, the hinge shaft passing through the center portion of the lock member, the lock member capable of engaging alternately with the mounting portion of the receiver section and said one of the pair of mounting portions of the transmitter section by axial sliding movement and having an arc-shaped opening on a face portion thereof;

a compression spring wound around the hinge shaft and disposed under compression between the lock member and the rotor for pressing the rotor against the stator; and a push-button disposed within one of the mounting portions of the transmitter section in an axially slidable manner with the hinge shaft passing through the portion of the push-button and engaged therewith, the push-button having a pressing cam portion that penetrates the arc-shaped opening of the lock member and is in contact with pressure-receiving cam portion of said rotor, such that in a close position of the transmitter section and the receiver section, when the push button is pushed, the rotor is rotated by means of the pressure-receiving cam portion and the pressing cam portion, so that the opposite end of the torsion spring is engaged with the arresting portion of the rotor apart from the arresting groove in a resilient manner, thus the receiver section is automatically opened to predetermined open angle, and when the receiver section is closed against the transmitter section to a predetermined close angle, the opposite end of the torsion spring is engaged with the arresting groove of said stator apart from the arresting portion by being pushed through the inclined portion, and in the closed position the lock member locks between the transmitter section and the receiver section.

2. An opening and closing device for a portable telephone, comprising:

a pair of mounting portions provided on a base of a transmitter section and having a predetermined space formed therebetween;

a mounting portion of a receiver section disposed between the pair of mounting portions and connected thereto by a hinge shaft;

a stator axially received by and fixed to one of the pair of mounting portions of the transmitter section and having the hinge shaft passing therethrough, the stator having an arresting groove and a pair of first convex portions on an exposed side end portion;

a rotor disposed within the mounting portion of the receiver section in an axially slidable manner with the hinge shaft passing through the center portion of the rotor, the rotor engaged with the mounting portion of the receiver section and having an arresting portion with an inclined portion and a pair of second convex portions on a rotor end portion facing said stator and further having a pressure-receiving cam portion projecting from the other rotor end;

a torsion spring wound around said hinge shaft and received in said stator, one end of the torsion spring being engaged with said stator while the opposite end of the torsion spring is alternately engaged with the arresting portion of the rotor and the arresting groove of said stator by a rotary position of the rotor;

a lock member disposed between the mounting portion of the receiver section and one of the mounting portions of transmitter section is an axially slidable manner, the hinge shaft being passed through the center portion of the lock member, the lock member capable of engaging alternately with the mounting portion of the receiver section and said mounting portion of the transmitter section by axial sliding movement and having an arc-shaped opening on a face portion thereof;

a compression spring wound around the hinge shaft and disposed under compression between the lock member and the rotor for pressing the rotor against the stator;

a friction mechanism includes the first convex portions, the second convex portions which contact under pressure with said first convex portions within a predetermined open angle range of said receiver section, and the compression spring for biasing said second convex portions against said first convex portions; and a push-button disposed within one of the mounting portions of the transmitter section in an axially slidable manner with the hinge shaft being passed through the portion of the push-button and engaged therewith, the push-button having a pressing cam portion that penetrates the arc-shaped opening of the lock member and is in contact with pressure-receiving cam portion of said rotor, whereby, in a close position of the transmitter section and the receiver section, when the push button is pushed, the rotor is rotated by means of the pressure-receiving cam portion and the pressing cam portion, so that the opposite end of the torsion spring is engaged with the arresting portion of the rotor apart from the arresting groove in a resilient manner, thus the receiver section is automatically opened to predetermined open angle, and after the predetermined open angle of the receiver section, the receiver section is freely stopped at any position, and so that when the receiver section is closed against the transmitter section to a predetermined close angle, the opposite end of the torsion spring is engaged with the arresting groove of said stator apart from the arresting portion by being pushed through the inclined portion, and in the closed position, the lock member locks between the transmitter section and the receiver section.

3. An opening and closing device for a portable telephone, comprising:

a transmitter section;

a receiver section connected at a mounting potion thereof to a mounting portion of said transmitter section for pivotal movement into and from a twofold condition by means of a hinge shaft on said mounting portion of said transmitter section;

a stator axially received by and fixed to one of the pair of mounting portions of the transmitter section and having the hinge shaft passing therethrough, the stator having an arresting groove and a pair of first convex portions on an exposed side end portion;

a rotor disposed within the mounting portion of the receive section in an axially slidable manner with the hinge shaft being passed through the center portion of the rotor, the rotor engaged with the mounting portion of the receiver section and having an arresting portion with an inclined portion and a pair of second convex portions on a rotor end portion facing said stator and further having a pressure-receiving cam portion projecting from the other rotor end;

a torsion spring wound around said hinge shaft and received in said stator, one end of the torsion spring being engaged with said stator while the opposite end of the torsion spring is alternately engaged with the arresting portion o the rotor and the arresting groove of said stator by a rotary position of the rotor;

arresting means on the arresting portion for arresting the end portion of said torsion spring, the inclined portion provided in a rewiring direction of said torsion spring with respect to said arresting portion, the arresting groove for arresting the end portion of said torsion spring released from arresting by said arresting portion;

a lock member disposed between the mounting portion of the receiver section and one of the mounting portions of transmitter section is an axially slidable manner, the hinge shaft passing through the center portion of the lock member, the lock member capable of engaging alternately with the mounting portion of the receiver section and said mounting portion of the transmitter section by axial sliding movement and having an arc-shaped opening on a face portion thereof;

a compression spring wound around the hinge shaft and disposed under compression between the lock member and the rotor for pressing the rotor against the stator; and a push-button disposed within one of the mounting portions of the transmitter section in an axially slidable manner with the hinge shaft being passed through the portion of the push-button and engaged therewith, the push-button having a pressing cam portion that penetrates the arc-shaped opening of the lock member and is in contact with pressure-receiving cam portion of said rotor such that, in a close position of the transmitter section and the receiver section, when the push button is pushed, the rotor is rotated by means of the pressure-receiving cam portion and the pressing cam portion, so that the opposite end of the torsion spring is engaged with the arresting portion of the rotor apart from the arresting groove in a resilient manner, thus the receiver section is automatically opened to predetermined open angle, and when the receiver section is closed against the transmitter section to a predetermined close angle, the opposite end of the torsion spring is engaged with the arresting groove of said stator apart from the arresting portion by being pushed through the inclined portion, and in the closed position, the lock member locks between the transmitter section and the receiver section.

4. An opening and closing device for a portable telephone, comprising:

a transmitter section;

a receiver section connected at a mounting portion thereof to a mounting portion of said transmitter section for pivotal movement into and from a two fold condition by means of a hinge shaft on said mounting portion of said transmitter section;

a stator axially received by and fixed to one of the pair of mounting portions of the transmitter section and having the hinge shaft passing therethrough, the stator having an arresting groove and a pair of first convex portions on an exposed side end portion;

a rotor disposed within the mounting portion of the receiver section in an axially slidable manner with the hinge shaft being passed through the center portion of the rotor, the rotor engaged with the mounting portion of the receiver section and having an arresting portion with an inclined portion and a pair of second convex portions on a rotor end portion facing said stator and further having a pressure-receiving cam portion projecting from the other rotor end;

a torsion spring wound around said hinge shaft and received in said stator, one end of the torsion spring being engaged with said stator while the opposite end of the torsion spring is alternately engaged with the arresting portion of the rotor and the arresting groove of said stator by a rotary position of the rotor;

an arresting means includes the arresting portion provided on an end face of a rotor accommodated in said mounting portion of said receiver section for arresting the end portion of said torsion spring, the inclined portion provided in a rewiring direction of said torsion spring with respect to said arresting portion, the arresting groove positioned in an axial direction of said torsion spring on said mounting portion of said transmitter section for arresting the end portion of said torsion spring released from arresting by said arresting portion;

a lock member disposed between the mounting portion of the receiver section and one of the mounting portions of transmitter section is an axially slidable manner, the hinge shaft being passed through the center portion of the lock member, the lock member capable of engaging alternately with the mounting portion of the receiver section and said mounting portion of the transmitter section by axial sliding movement and having an arc-shaped opening on a face portion thereof;

a compression spring wound around the hinge shaft and disposed under compression between the lock member and the rotor for pressing the rotor against the stator;

a friction mechanism includes the first convex portions, the second convex portions which contact under pressure with said first convex portions within a predetermined open angle range of said receiver section, and the compression spring for biasing said second convex portions against said first convex portions; and a push-button disposed within one of the mounting portions of the transmitter section in an axially slidable manner with the hinge shaft being passed through the portion of the push-button and engaged therewith, the push-button having a pressing cam portion that penetrates the arc-shaped opening of the lock member and is in contact with pressure-receiving cm portion of said rotor so that, in a close position of the transmitter section and the receiver section, when the push button is pushed, the rotor is rotated by means of the pressure-receiving cam portion and the pressing cam portion, so that the opposite end of the torsion spring is engaged with the arresting portion of the rotor apart from the arresting groove in a resilient manner, thus the receiver section is automatically opened to predetermined open angle, whereby after the predetermined open angle of the receiver section, the receiver section is freely stopped at any position, and when the receiver section is closed against the transmitter section to a predetermined close angle, the opposite end of the torsion spring is engaged with the arresting groove of said stator apart from the arresting portion being pushed through the inclined portion, and in the closed position, the lock member locks between the transmitter section and the receiver section.

5. An opening and closing device for a portable telephone, comprising:

a pair of mounting portions provided on a base of a transmitter section, the mounting portions of a transmitter section having a predetermined space formed therebetween;

a mounting portion of a receiver section disposed between the pair of mounting portions and connected thereto by a hinge shaft;

a stator axially received by and fixed to one of the pair of mounting portions of the transmitter section and having the hinge shaft passing therethrough, the stator having an arresting groove and a pair of first convex portions on an exposed side end portion;

a rotor disposed within the mounting portion of the receiver section in an axially slidable manner with the hinge shaft being passed through the center portion of the rotor, the rotor engaged with the mounting portion of the receiver section and having an arresting portion with an inclined portion and a pair of second convex portions on a rotor end portion facing said stator and further having a pressure-receiving cam portion projecting from the other rotor end;

a torsion spring wound around said hinge shaft and received in said stator, one end of the torsion spring being engaged with said stator while the opposite end of the torsion spring is alternately engaged with the arresting portion of the rotor and the arresting groove of said stator by a rotary position of the rotor;

a lock member disposed between the mounting portion of the receiver section and one of the mounting portions of transmitter section is an axially slidable manner, the hinge shaft being passed through the center portion of the lock member, the lock member capable of engaging alternately with the mounting portion of the transmitter section by axial sliding movement and having an arc-shaped opening on a face portion thereof;

a compression spring wound around the hinge shaft and disposed under compression between the lock member and the rotor for pressing the rotor against the stator;

a friction mechanism includes the first convex portions, the second convex portions which contact under pressure with said first convex portions within a predetermined open angle range of said receiver section, and the compression spring for biasing said second convex portions against the first convex portions;

a push-button disposed within one of the mounting portions of the transmitter section in an axially slidable manner with the hinge shaft being passed through the portion of the push-button and engaged therewith, the push-button having a pressing cam portion that penetrates the arc-shaped opening of the lock member and is in contact with pressure-receiving cam portion of said rotor; and a cam mechanism includes the pressing cam portion, and the pressure receiving cam portion having the inclined portion, whereby, in a close position of the transmitter section and the receiver section, when the push button is pushed, the rotor is rotated by means of the pressure-receiving cam portion and the pressing cam portion, so that the opposite end of the torsion spring is engaged with the arresting portion of the rotor apart from the arresting groove in a resilient manner, thus the receiver section is automatically opened to predetermined open angle, and after the predetermined open angle of the receiver section, the receiver section is freely stopped at any position, and further, when the receiver section is closed against the transmitter section to a predetermined close angle, the opposite end of the torsion spring is engaged with the arresting groove of said stator apart from the arresting portion by being pushed through the inclined portion, and in the closed position, the lock member locks between the transmitter section and the receiver section.

6. An opening and closing device for a portable telephone, comprising:

a transmitter section;

a receiver section connected at a mounting portion thereof to a mounting portion of said transmitter section for pivotal movement into and from a twofold condition by means of a hinge shaft on said mounting portion of said transmitter section;

a stator axially received by and fixed to one of the pair of mounting portions of the transmitter section and having the hinge shaft passing therethrough, the stator having an arresting groove and a pair of first convex portions on an exposed side end portion;

a rotor disposed within the mounting portion of the receiver section in an axially slidable manner with the hinge shaft being passed through the center portion of the rotor, the rotor engaged with the mounting portion of the receiver section and having an arresting portion with an inclined portion and a pair of second convex portions on a rotor end portion facing said stator and further having a pressure-receiving cam portion projecting from the other rotor end;

a torsion spring wound around said hinge shaft and received in said stator, one end of the torsion spring being engaged with said stator while the opposite end of the torsion spring is alternately engaged with the arresting portion of the rotor and the arresting groove of said stator by a rotary position of the rotor;

an arresting means includes an arresting portion for arresting the end portion of said torsion spring, the inclined portion provided in a rewiring direction of said torsion spring with respect to said arresting portion, the arresting groove for arresting the end portion of said torsion spring released from arresting by said arresting portion;

a lock member disposed between the mounting portion of the receiver section and one of the mounting portions of transmitter section is an axially slidable manner, the hinge shaft being passed through the center portion of the lock member, the lock member capable of engaging alternately with the mounting portion of the receiver section and said mounting portion of the transmitter section by axial sliding movement and having an arc-shaped opening on a face portion thereof;

a compression spring wound around the hinge shaft and disposed under compression between the lock member and the rotor for pressing the rotor against the stator;

a push-button disposed within one of the mounting portions of the transmitter section in an axially slidable manner with the hinge shaft being passed through the portion of the push-button and engaged therewith, the push-button having a pressing cam portion that penetrates the arc-shaped opening of the lock member and is in contact with pressure-receiving cam portion of said rotor; and the cam mechanism includes a pressing cam portion provided the pressure receiving cam portion having the inclined portion, so that, in a close position of the transmitter section and the receiver section, when the push button is pushed, the rotor is rotated by means of the pressure-receiving cam portion and the pressing cam portion, so that the opposite end of the torsion spring is engaged with the arresting portion of the rotor apart from the arresting groove in a resilient manner, thus the receiver section is automatically opened to predetermined open angle, and when the receiver section is closed against the transmitter section to a predetermined close angle, the opposite end of the torsion spring is engaged with the arresting groove of said stator apart from the arresting portion by being pushed through the inclined portion, and in the closed position, the lock member locks between the transmitter section and the receiver section.

* * * * *